United States Patent [19]

Tremblay et al.

[11] 4,392,240
[45] Jul. 5, 1983

[54] METHOD AND DEVICE FOR SAMPLING RADIATION FROM X-RAY MACHINES FOR ANALYSIS

[75] Inventors: Richard Tremblay, Les Saules; Jean Tremblay, Ste-Foy, both of Canada

[73] Assignee: Ministere Des Affaires Sociales, Quebec, Canada

[21] Appl. No.: 311,190

[22] Filed: Oct. 14, 1981

[51] Int. Cl.³ .......................... A61B 6/00; H05G 1/00; G01T 1/11
[52] U.S. Cl. ...................................... 378/207; 250/337
[58] Field of Search .......................... 378/207; 250/337

[56] References Cited

U.S. PATENT DOCUMENTS 2,258,593 10/1941 Black .................................. 378/207
3,582,653 6/1971 Howard .............................. 250/337
4,303,857 12/1981 Inoue et al. ........................ 250/337

OTHER PUBLICATIONS

Lin, P.-J. P., "Penetration Quality Measurement for Standardization of Radiographic Image Quality," *Medical Physics*, vol. 2, No. 1, Jan./Feb. 1975.
Langmead et al., "A TLD System Based on Lithium Borate for the Measurement of Doses to Patients Undergoing Medical Irradiation," *Phys. Med. Biol.*, vol. 21, No. 1, pp. 39-51, 1976.

Primary Examiner—Eugene La Roche
Assistant Examiner—T. N. Grigsby
Attorney, Agent, or Firm—Alan Swabey; Robert Mitchell; Guy J. Houle

[57] ABSTRACT

A method and a device for sampling a radiation field emitted from an X-ray machine for determining certain operational characteristics of the machine. A cassette container is disposed at a predetermined position relative to a radiation field of the X-ray machine. The cassette container houses a removable holder containing one or more thermo-luminiscent crystals associated with a respective one or more crystal filters supported in the container. The filters have different densities from one another. An X-ray sensitive film is also removably supported under a further plurality of filters, also having different densities from one another, whereby the film and the crystals are subjected to filtered radiation from the X-ray beam and undergo a physical change proportional to the strength of radiation received so that analysis of same will provide a determination of the size of the radiation field, the dose of radiation, the filtration of the X-ray radiation emitting from the machine, and the operating kilovoltage applied to an X-ray source of the machine.

11 Claims, 4 Drawing Figures

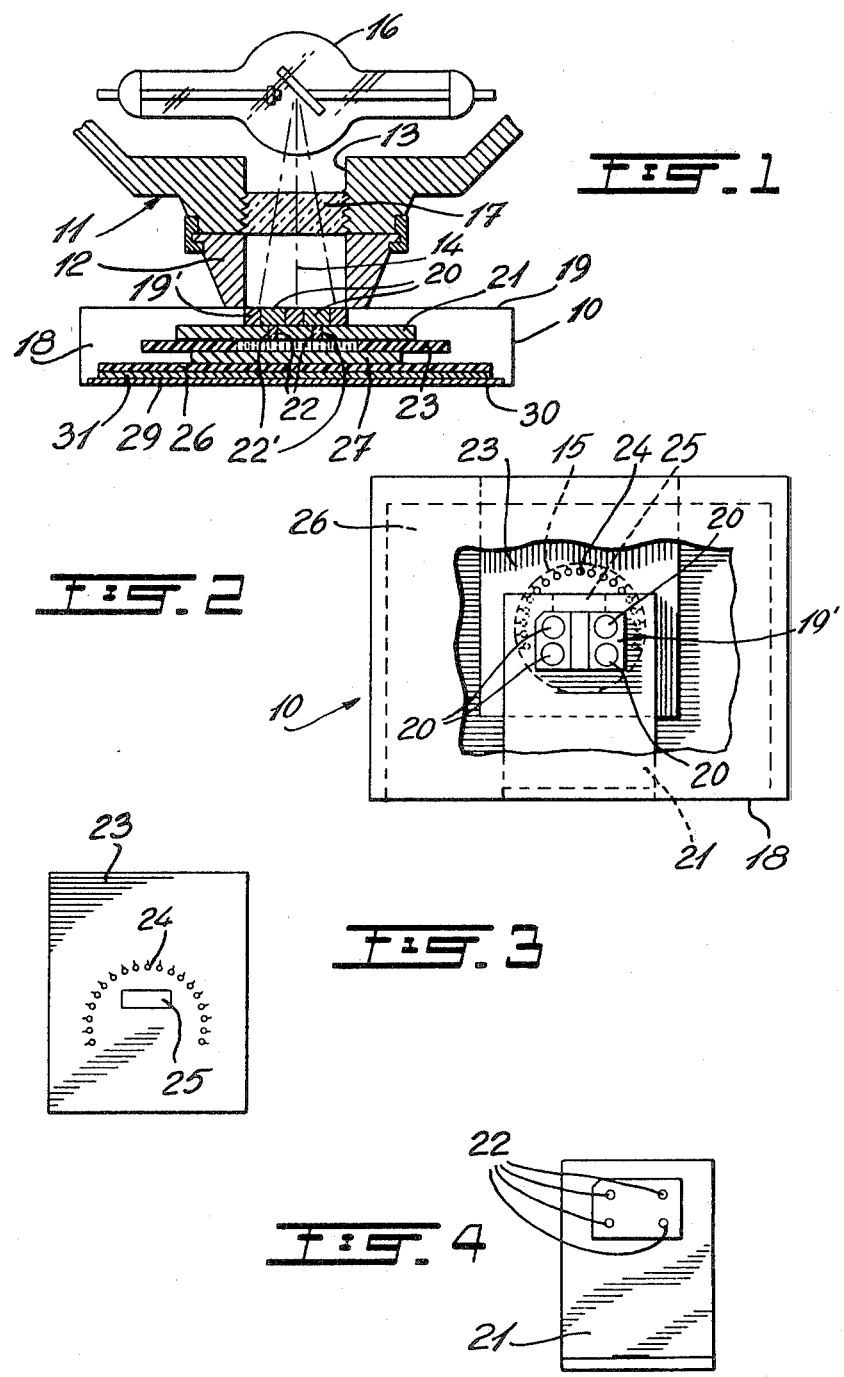

METHOD AND DEVICE FOR SAMPLING RADIATION FROM X-RAY MACHINES FOR ANALYSIS

BACKGROUND OF INVENTION (a) Field of the Invention

The present invention relates to a method and a device for sampling a radiation field emitted from an X-ray machine for the determination of certain operational characteristics of the machine. The device is in a cassette form whereby sampling of devices may be effected by the user of the device and analysis of the information contained in the cassette may be done at a central processing laboratory where the cassettes are forwarded by the users whereby to monitor the efficiency of X-ray machines.

(b) Description of Prior Art

In the prior art, various devices are known using X-ray Fresnel zone plates disposed to intercept an X-ray beam and an image receptor is disposed to receive the resulting image of the zone delineated by the X-ray beam. However, such devices are used for evaluating focal spots in X-ray tubes and do not provide for the evaluation of other important characteristics of an X-ray machine such as the dosage of radiation, the filtration efficiency of the machine, and the operating kilovoltage applied to the X-ray source or tube in the machine. It is medically established that frequent exposure to overdose of X-ray radiation is undesirable. This is particularly true in the dentistry field where the same patient may be frequently X-rayed and it is therefore important that these X-ray machines operate efficiently whereby radiation doses are kept to the prescribed amount of radiation.

Other prior art is known whereby an image is formed on an X-ray sensitive film showing density patterns (tones) corresponding to a series of energizing voltages furnished from an X-ray machine whereby these densities can be evaluated with respect to a standard film whereby to measure the radiant energy emitted by an X-ray machine to calibrate same. In all method known, the film is utilized with a screen which emits light to obtain an exposure and it is essential that the film be removed in a dark room.

SUMMARY OF INVENTION

It is a feature of the present invention to provide a cassette container which removably houses a film and thermo-luminescent crystals disposed in relationship to filters in the cassette whereby after exposure to X-ray radiation, the thermo-luminescent crystals and film are removed and analyzed to determine a plurality of desired characteristics of the X-ray machine.

Another feature of the present invention is to provide a method of sampling a radiation field emitted from an X-ray machine by utilizing a cassette whereby the user of the machine may expose the cassette to radiation emitted from his X-ray machine and expedite the cassette or the film and crystal cards to a central laboratory for analysis whereby certain operational characteristics of the machine are determined to monitor the proper operation of the machine.

Another feature of the present invention is to provide an X-ray beam sampling device which is compact, economical to construct and which provides easy sampling of the radiation field emitted by an X-ray machine.

According to the above features, from a broad aspect, the present invention provides an X-ray beam sampling device comprising container means removably positionable at a predetermined position to relative to a radiation field of an X-ray machine. The container means has a removable holder containing one or more thermo-luminescent crystals associated with a respective one or more crystal filters supported in the container. The filters have different densities from one another. An X-ray sensitive film is removably supported under a further plurality of filters, also having different densities from one another, whereby the film and the crystals are subjected to filtered radiation from the beam and undergo physical change proportional to the strength of radiation received so that analysis of same will provide a determination of the size of the radiation field, the skin dose of radiation, the filtration of the X-ray radiation emitted from the machine, and the operating kilovoltage applied to an X-ray source on the machine.

According to a further broad aspect of the present invention, there is provided a method of sampling a radiation field emitted from an X-ray machine for the determination of certain operational characteristics of the machine. The method comprises disposing a cassette container having one or more thermo-luminescent crystals supported therein under a respective filter, each filter having different densities from one another. The container also has an X-ray sensitive film supported under a further plurality of filters also having different densities from one another. The machine is operated to produce an X-ray beam over a predetermined area of the container and for a predetermined exposure time. The thermo-luminescent crystals and the film are then analyzed to determine the operational characteristics of the machine.

A preferred embodiment of the present invention will now be described with reference to the accompanying drawings in which:

FIG. 1 is a fragmented schematic view showing the X-ray beam sampling device of the present invention positioned adjacent the cone of an X-ray machine containing an X-ray tube;

FIG. 2 is a plan view showing the disposition of the various elements contained in the cassette;

FIG. 3 is a plan view showing the removable filter support card positioned over the film, and FIG. 4 is a plan view showing the removable thermo-luminescent crystals support card.

DESCRIPTION OF PREFERRED EMBODIMENTS

Referring now to the drawings and more particularly to FIG. 1, there is shown generally at 10 the X-ray beam sampling device of the present invention which is removably positionable at a predetermined position adjacent a cone 12 of an X-ray machine 11. The machine 11 has an aperture 13 through which X-ray radiation 14 is directed to provide an X-ray on an area, such as 15 in FIG. 2, to be irradiated. The radiation 14 is emitted from an X-ray tube or source 16 and the radiation beam 14 passes through the glass of the tube 16, a filter lens assembly 17 and all other elements in its path, as is well known in the art.

The sampling device 10, of the present invention, is a cassette type container 18 having a top face 19 on which there is disposed two lead plates 19' in which there is positioned a plurality of filter elements 20, herein filter elements constructed of aluminum plates of different thicknesses whereby radiation impinging on each of these plates is filtered in different proportions by each of the filters.

A crystal support card 21 is removably positionable immediately under the lead plate 19' whereby to precisely locate a plurality (herein four) thermo-luminescent crystals 22 substantially concentrically under an associated one of the filters 20. FIG. 4 shows a plan view of the crystal support card 21 and the location of the thermo-luminescent crystals 22 thereon. Under each thermo-luminescent crystal 22 there is positioned a wafer of stainless steel and copper to reduce back radiation effects on the crystals.

Referring additionally to FIGS. 2 to 4, it can be seen that the focal spot 15 of the radiation field completely encircles the thermo-luminescent crystals and the lead plate 19' about the filters 20 completely shields the area about the thermo-luminescent crystals 22 whereby to shield the crystal against diffused radiation rays from outside the area of the filters 20.

Immediately below the crystal support card 21 there is removably secured a filter support card 23 supporting a plurality of further filters 24, each also having a different density. The filters 24 are constituted by different thicknesses of copper sheet. A further filter area 25 is provided to obtain a reference image on a film 26 which is positioned therebelow. Although not shown, a further thin sheet of copper covers the filters 24 and 25 wherein to absorb the low energy radiation in the beam so as to obtain more precise readings. As radiation impinges on the filters 24 and 25, they will produce images on the film 26, such images being of different tones depending on the density of the filter mediums.

A perforated radiation shield layer or sheet 27 is positioned intermediate the removable filter support card 23 and the film 26 to permit passage of radiation in the area of the plurality of filters 24 and 25 only whereby to shield the film against diffused radiation rays from other areas. Also, a thin sheet of metal 31, herein aluminum, is provided under the film to obtain uniform back radiation to obtain more precise readings.

In operation, the cassette 18 is loaded with the crystal support card 21 and the filter support card 23 and positioned against the cone 12 of an X-ray machine 11 transversely to the radiation beam 14 whereby the crystals and the filters are disposed within the beam as shown in FIG. 2. The machine is operated to produce the X-ray beam over a predetermined exposure time and the cassette is then removed and forwarded to a central processing laboratory where the thermo-luminescent crystals and the film are analyzed to determine the operational characteristics of the machine. Values are obtained from the light being emitted by the thermo-luminescent crystals, which light emission is proportional to the dose of radiation that the crystals were subjected to. Of course, the crystals being associated with filters of different densities will receive different doses of radiation.

There are four thermo-luminescent crystals 22 and therefore four different values of the radiation, as measured in miliroegten (mR). On the other hand, the film, when developed will give the size of the irradiated surface (i.e. the size of the irradiation field) as well as give a pattern of irradiated dots corresponding to the filter configuration of the filters 24 and of the filter 25 and these dots are of different densities, also depending on the radiation dosage associated with each of the filters. By tracing on log-log grid paper to optical density has a function of the thickness of copper material, we obtain a straight line which when compared to other calibrated curves permits the obtention of the kilovoltage of the X-ray machine.

Knowing the kilovoltage of the X-ray machine we can then determine the inherent filtration of the machine. This evaluation procedure is carried out in a manner similar to that described in the NCRP volume no. 35 Table 9 by establishing a comparison Table specifically calibrated for the specific cassette being analyzed. The purpose of the filter 25 is to obtain a reference on the film which gives the irradiation dose directly on the skin.

Reproduced hereinbelow is Table 9 of the above-referenced NRCP volume no. 25.

| | TOTAL FILTRATION | | | | |
| | LAYER OF SEMI-ATTENUATION | | | | |
| mm Al | 45 kVp | 50 kVp | 70 kVp | 90 kVp | 100 kVp |
|---|---|---|---|---|---|
| .5 | .5 | 0.6 | 0.8 | 0.9 | 1 |
| 1.0 | .9 | 0.9 | 1.2 | 1.5 | 1.6 |
| 1.5 | 1.2 | 1.2 | 1.6 | 1.9 | 2.1 |
| 2.0 | | 1.5 | 1.9 | 2.3 | 2.5 |
| 2.5 | | 1.7 | 2.2 | 2.6 | 2.8 |

The malfunctions of the X-ray machine 11 are then determined from this comparison and corrective action is then reported back to the user whereby to adjust his X-ray machine to operate within established specification. Accordingly, with the device of the present invention, it is possible to monitor a great number of X-ray machines from a central processing laboratory whereby the users of the X-ray machine can forward cassettes having been exposed by X-ray radiation to the laboratory for analysis and the cassette is then refurbished and returned by the laboratory to the user with indications of the operating characteristics of the machine and corrective action to be taken if necessary to adjust the machine.

Another feature of the cassette 18 of the present invention is that the backface 30 of the cassette is provided with a support frame to contain a permit or certificate 29 whereby the cassette is used as a frame to display the certificate on a wall. Thus, the cassette is not misplaced and is always available to the user. The cassette is a very thin frame-like member unlike that shown in FIG. 1 where the actual dimensions have been increased to illustrate the contents thereof.

It is within the ambit of the present invention to cover any obvious modifications of the example of a preferred embodiment described herein provided such modifications fall within the scope of the appended claims.

We claim:

1. An X-ray beam sampling device comprising container means removably positionable at a predetermined position relative to a radiation field of an X-ray machine, said container means having a removable holder containing one or more thermo-luminescent crystals associated with a respective one or more crystal filters supported in said container, said filters having different densities from one another, and an X-ray sensitive film removably supported under a further plurality of filters also having different densities from one another whereby said film and said crystals are subjected to filtered radiation from said beam and undergo a physical change proportional to the strength of radiation received so that analysis of same will provide a determination of the size of the radiation field, the dose of radiation, the filtration of said X-ray radiation eminating from said machine, and the operating kilovoltage applied to an X-ray source in said machine.

2. A device as claimed in claim 1 wherein said further plurality of filters are secured to a removable support card retained in said container above said film.

3. A device as claimed in claim 2 wherein there is further provided a radiation shield layer intermediate said removable filter support card and said film whereby to permit passage of radiation in the area of said plurality of filters on said removable filter support card and to shield said film against radiation rays from other areas.

4. A device as claimed in claim 3 wherein said crystal filters are isolated from each other by a radiation shield so that their associated crystals are not exposed to diffused radiation from outside the crystal filter areas.

5. A device as claimed in claim 4 wherein said container is a cassette container removably positionable against a cone of an X-ray machine lens.

6. A device as claimed in claim 4 wherein said crystal filters are constituted of different thicknesses of aluminum sheet material, said further plurality of filters being constituted by different thicknesses of copper sheet material.

7. A device as claimed in claim 4 wherein said removable filter card also contains a reference filter to obtain a reference exposure image on said film.

8. A device as claimed in claim 4 wherein there is further provided a wafer of stainless steel and copper under each said thermo-luminescent crystals to reduce the effects of back radiation on said crystals.

9. A method of sampling a radiation field emitted from an X-ray machine for the determination of certain operational characteristics of said machine, said method comprising:
  (i) disposing a cassette container having one or more thermo-luminescent crystals supported therein under a respective filter, each filter having different densities from one another, said container also having an X-ray sensitive film supported under a further plurality of filters also having different densities from one another,
  (ii) operating said machine to produce an X-ray beam over a predetermined area of said container and for a predetermined exposure time, and
  (iii) analyzing said thermo-luminescent crystals and film to determine said operational characteristics of said machine.

10. A method as claimed in claim 9 wherein there is further provided the step of isolating said thermo-luminescent crystals and said film to prevent reception of diffused radiation eminating from areas other than the areas of said filters.

11. A method as claimed in claim 10 wherein said analyzing step comprises (i) obtaining values for light emitted from said thermo-luminescent crystals exposed to radiation and for the reading of image densities on said film, and (ii) comparing said values to a calibrated scale to obtain a determination of said characteristics indicative of the size of the radiation field, the dose of radiation, the filtration of said X-ray radiation emanating from said machine, and the operating kilovoltage applied to an X-ray source in said machine.

* * * * *